(12) United States Patent
Mack

(10) Patent No.: US 8,307,928 B2
(45) Date of Patent: Nov. 13, 2012

(54) SYSTEM AND METHOD FOR OPERATING AN ELECTRIC MOTOR BY LIMITING PERFORMANCE

(75) Inventor: David J. Mack, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 12/414,777

(22) Filed: Mar. 31, 2009

(65) Prior Publication Data

US 2009/0188733 A1 Jul. 30, 2009

Related U.S. Application Data

(60) Division of application No. 11/422,731, filed on Jun. 7, 2006, now Pat. No. 7,533,744, and a continuation of application No. 10/605,289, filed on Sep. 19, 2003, now Pat. No. 7,073,615.

(51) Int. Cl.
*B60W 20/00* (2006.01)
(52) U.S. Cl. ................. 180/65.285; 180/65.28
(58) Field of Classification Search .............. 180/65.28, 180/65.285, 65.29
See application file for complete search history.

(56) References Cited

U.S. PATENT DOCUMENTS

| | | | | |
|---|---|---|---|---|
| 5,670,830 | A | * | 9/1997 | Koga et al. .................... 307/10.1 |
| 5,789,881 | A | * | 8/1998 | Egami et al. ................... 318/139 |
| 5,832,396 | A | * | 11/1998 | Moroto et al. .................. 701/22 |
| 6,090,007 | A | | 7/2000 | Nakajima et al. |
| 6,301,529 | B1 | | 10/2001 | Itoyama et al. |
| 6,314,346 | B1 | | 11/2001 | Kitajima et al. |
| 6,326,702 | B1 | | 12/2001 | Yonekura et al. |
| 6,333,620 | B1 | | 12/2001 | Schmitz et al. |
| 6,344,732 | B2 | | 2/2002 | Suzuki |
| 6,362,602 | B1 | | 3/2002 | Kozarekar |
| 6,382,335 | B2 | | 5/2002 | Takashima et al. |
| 6,405,818 | B1 | | 6/2002 | Anthony et al. |
| 6,500,089 | B2 | | 12/2002 | Lasson et al. |
| 6,554,088 | B2 | | 4/2003 | Severinsky et al. |
| 6,580,977 | B2 | | 6/2003 | Ding et al. |
| 6,591,173 | B2 | | 7/2003 | Nada |
| 6,639,385 | B2 | | 10/2003 | Verbrugge et al. |
| 6,687,581 | B2 | | 2/2004 | Deguchi et al. |
| 6,694,232 | B2 | * | 2/2004 | Saito et al. ..................... 701/22 |
| 6,722,457 | B2 | | 4/2004 | Yamaguchi et al. |
| 6,791,203 | B1 | * | 9/2004 | Matsubara et al. ......... 290/40 C |
| 6,876,098 | B1 | | 4/2005 | Gray, Jr. |
| 6,889,126 | B2 | | 5/2005 | Komiyama et al. |
| 6,965,824 | B2 | * | 11/2005 | Ichimoto et al. .............. 701/113 |
| 7,062,916 | B2 | | 6/2006 | Kamijo et al. |
| 7,104,347 | B2 | | 9/2006 | Severinsky et al. |
| 7,631,710 | B2 | * | 12/2009 | Utsumi ...................... 180/65.21 |
| 7,641,009 | B2 | * | 1/2010 | Akimoto ................... 180/65.21 |
| 7,721,833 | B2 | * | 5/2010 | Kikuchi ..................... 180/65.28 |
| 2001/0009147 | A1 | | 7/2001 | Takashima et al. |
| 2002/0065589 | A1 | | 5/2002 | Ostberg et al. |
| 2005/0061562 | A1 | | 3/2005 | Mack |
| 2009/0188733 | A1 | * | 7/2009 | Mack ....................... 180/65.285 |

* cited by examiner

*Primary Examiner* — Jeffrey J Restifo
(74) *Attorney, Agent, or Firm* — Brooks Kushman P.C.; David B. Kelley

(57) ABSTRACT

A method and system for limiting motor performance in a hybrid electric vehicle system. During a condition in a primary drivetrain, the method limits performance of an electric motor used in an auxiliary drivetrain to control energy consumed from a battery in the auxiliary drivetrain. A calculation or measurement is made to determine available battery energy remaining in the battery after the condition. The performance of the electric motor is then limited based on the available battery energy.

13 Claims, 5 Drawing Sheets

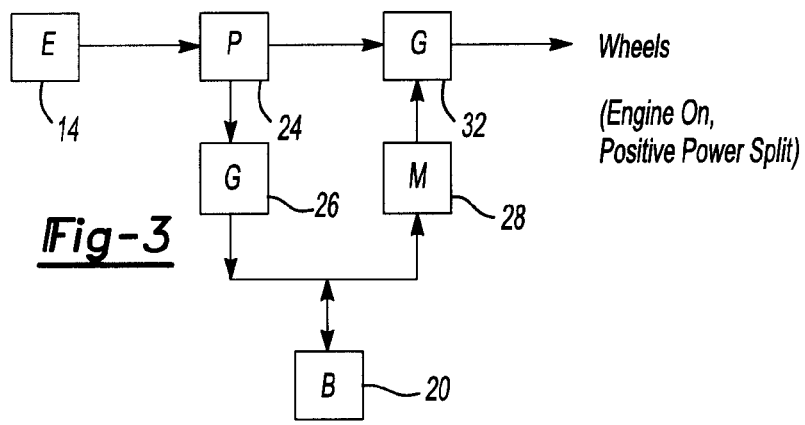
Fig-3 (Engine On, Positive Power Split)
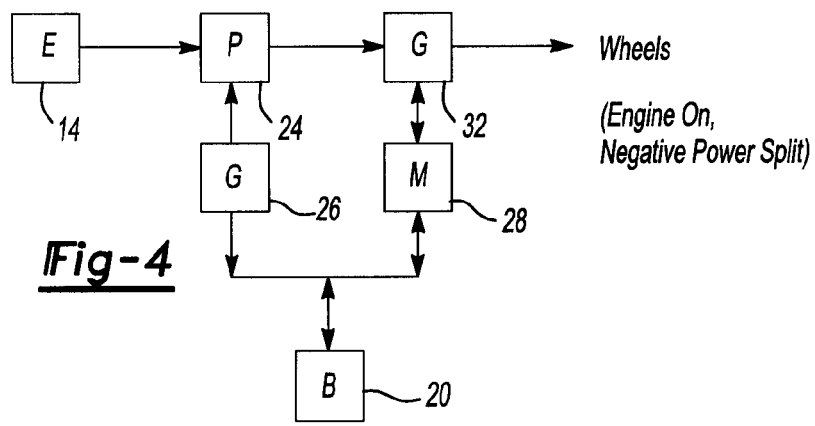
Fig-4 (Engine On, Negative Power Split)
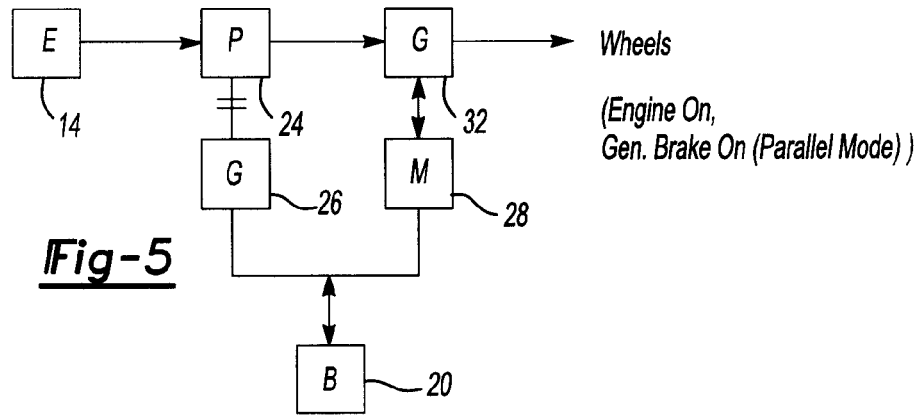
Fig-5 (Engine On, Gen. Brake On (Parallel Mode))
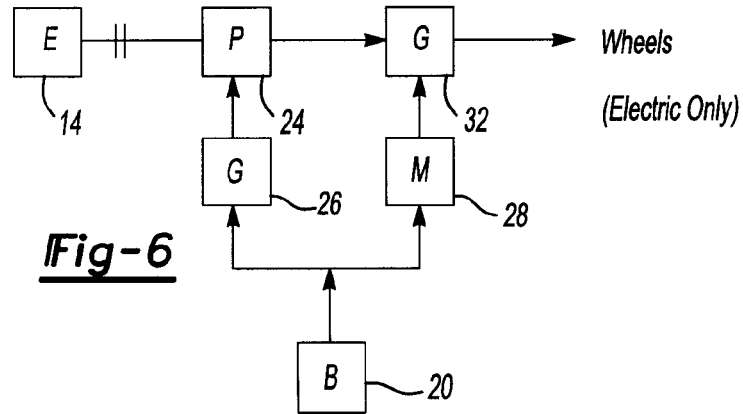
Fig-6 (Electric Only)

| SOC | MaxSpeed |
|---|---|
| 50 | 45mph |
| 45 | 35mph |
| 35 | 25mph |
| 20 | 15mph |

| SOC | MaxPower |
|---|---|
| 50 | 25kW |
| 45 | 15kW |
| 35 | 10kW |
| 20 | 5kW |

| SOC | MaxSpeed | MaxPower |
|---|---|---|
| 50 | 45mph | 25kW |
| 45 | 35mph | 15kW |
| 35 | 25mph | 10kW |
| 20 | 15mph | 5kW |

SYSTEM AND METHOD FOR OPERATING AN ELECTRIC MOTOR BY LIMITING PERFORMANCE

CROSS-REFERENCE TO RELATED APPLICATIONS

This application is a divisional of U.S. application Ser. No. 11/422,731 filed Jun. 7, 2006; which is a continuation of U.S. Pat. No. 7,073,615 filed Sep. 19, 2003.

BACKGROUND OF THE INVENTION

1. Field of the Invention

The present invention relates to electrically driven vehicles. In particular, the present invention relates to limiting motor performance in accordance with certain operating conditions of the vehicle.

2. Background Art

The present invention relates to electrically driven vehicles having "electric only" capabilities. Common "electric only" capable hybrids include a series hybrid electric vehicle (SHEV), a parallel hybrid electric vehicle (PHEV), and a parallel/series hybrid electric vehicle (PSHEV).

"Electric only" capable vehicles include at least two power sources, where one of the at least two power sources stores energy and one of the power sources generates energy. The "electric only" designation indicates the vehicle can be driven with energy from the energy storing power source (battery) if the energy generating power source (engine or fuel cell) is turned off or not generating power.

The energy storing power sources can be distinguished from the energy generating power source because the storing power source must receive energy, rather than generating its own energy. Common energy storing power sources are batteries and common energy generating power sources are engines and fuel cells which consume fuel and produce chemical reactions to generate the electric energy.

Each of the power sources can be used to provide torque to wheels for driving the vehicle. The software, electronics, and mechanism which permit the power sources to provide torque to the wheels are referred to as a drivetrain.

The drivetrain for the energy storing power source is referred to as an auxiliary drivetrain to distinguish it from the drivetrain for the energy generating power source which is referred to as a primary drivetrain. In this manner, the primary drivetrain includes the generating power source and the auxiliary drivetrain includes the storing power source.

A problem may arise if the primary drivetrain experiences a condition which limits or prevents it from providing torque to the wheels or providing power to the auxiliary drivetrain. Assuming that the hybrid vehicle only includes one primary drivetrain and the storing energy source in the auxiliary drivetrain is a battery, the continued driving of the vehicle may be limited to the amount of available battery energy remaining in the battery.

The continued driving of the vehicle then becomes dependent on the remaining battery energy and how the remaining energy is used by an electric driving motor used to drive the vehicle. Generally, it is desirable to control the use of the remaining battery energy to prolong vehicle driving. Accordingly, there is a need for a method of optimally controlling the HEV when the primary drivetrain is limited or unable to provide nominal performance.

BRIEF DESCRIPTION OF THE DRAWINGS

FIG. 3 illustrates a positive parallel/series mode of operation for the hybrid electric vehicle system;

FIG. 4 illustrates a negative parallel/series mode of operation for the hybrid electric vehicle system;

FIG. 5 illustrates a parallel mode of operation of the hybrid electric vehicle system;

FIG. 6 illustrates an electric mode of operation of the hybrid electric vehicle system;

DETAILED DESCRIPTION OF THE PREFERRED EMBODIMENT(S)

The present invention relates to electrically driven vehicles having "electric only" capabilities. "Electric only" capabilities refer to vehicles which can operate with an "electric only" architecture. Common "electric only" capable hybrids include a series hybrid electric vehicle (SHEV), a parallel hybrid electric vehicle (PHEV), and a parallel/series hybrid electric vehicle (PSHEV).

Figure 1:
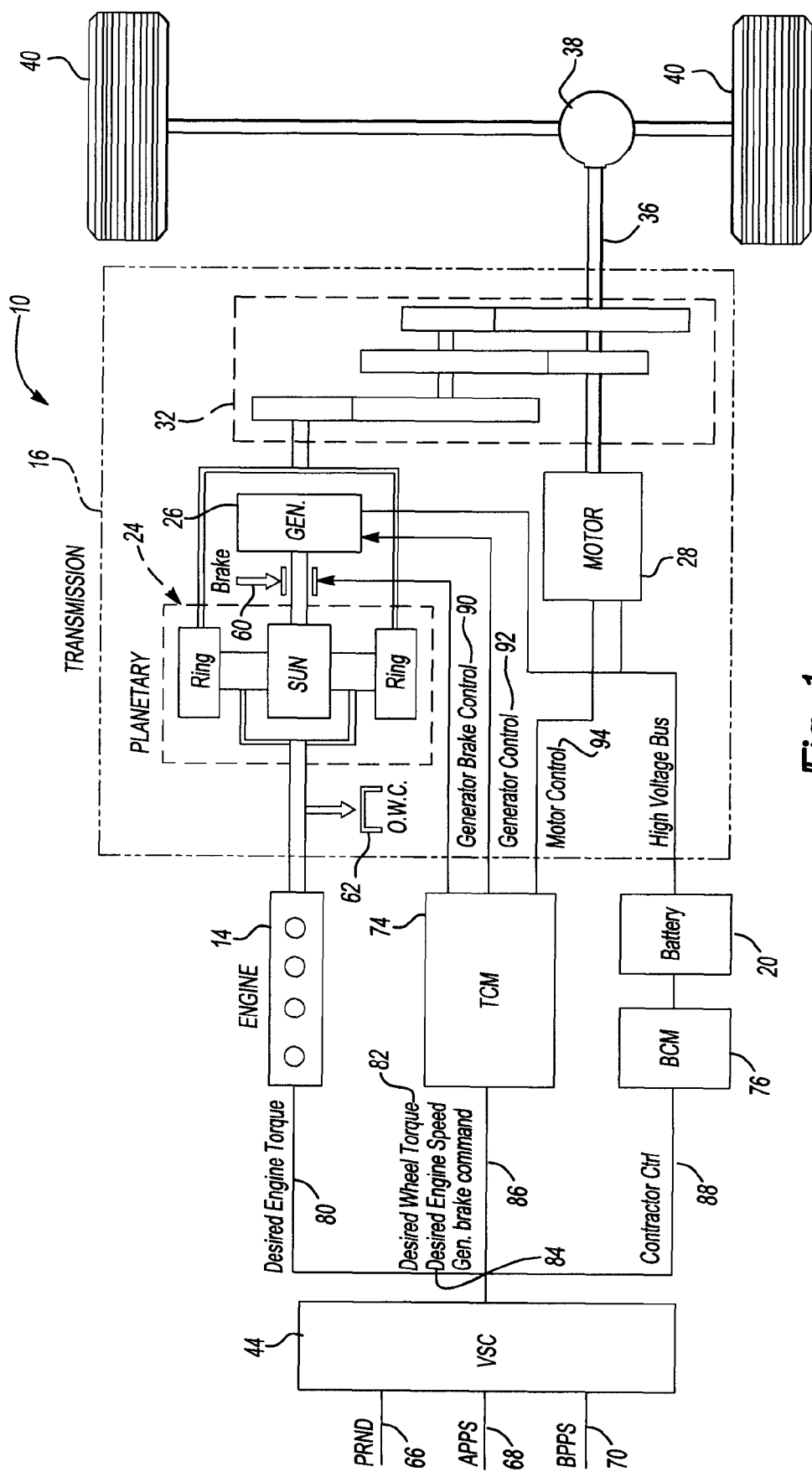
FIG. 1 illustrates an exemplary hybrid electric vehicle system for limiting motor performance during a condition in a primary drivetrain.

FIG. 1 illustrates an exemplary "electric only" capable hybrid vehicle that is commonly referred to as a parallel/series hybrid vehicle (PSHEV) system 10. The system 10 includes an engine 14, a transmission 16, and a battery 20 which operate with a planetary gear set 24, a generator 26, a motor 28, and meshing gears 32 to provide the torque. The torque is received by a torque shaft 36 fort transfer to a differential axle 38 mechanism for final delivery to wheels 40.

Figure 2:
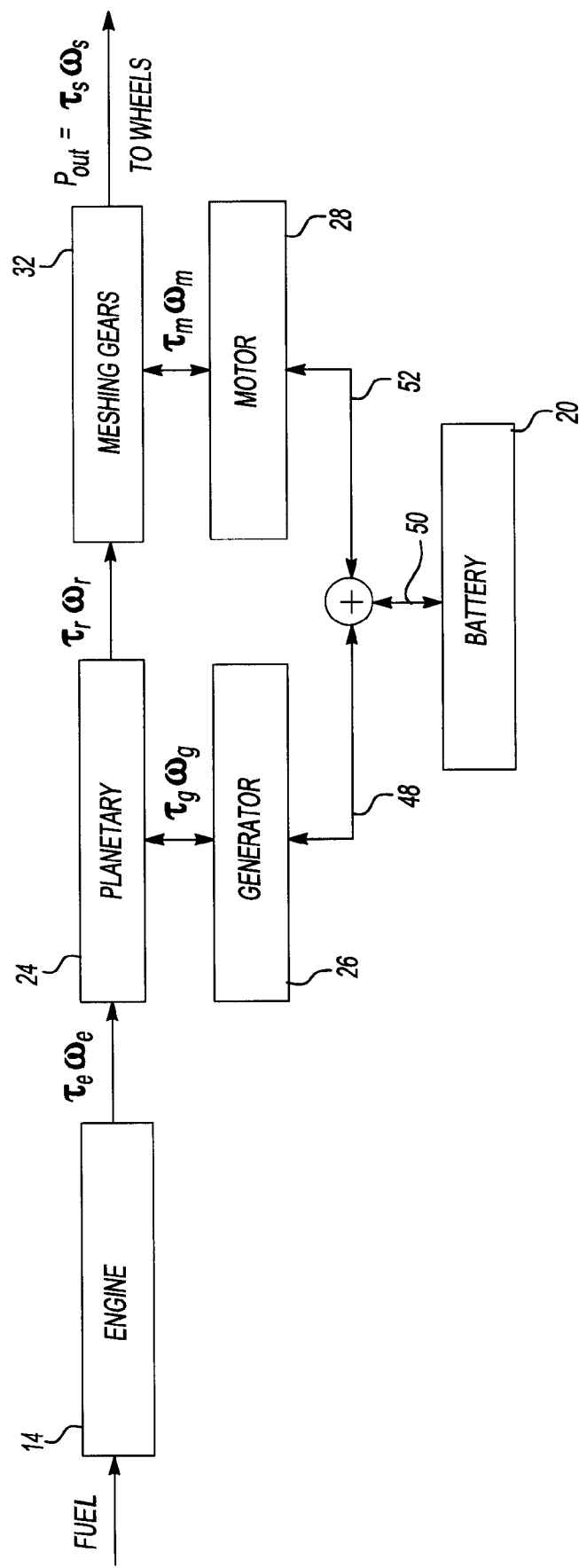
FIG. 2 illustrates power and torque flow in the hybrid electric vehicle system.

The system 10 provides torque for driving the hybrid vehicle. The manner in which torque is provided is variable and controllable by a vehicle system controller 44. FIG. 2 illustrates the variable and controllable means by which the vehicle system controller 44 can control power distribution in the system 10 for providing torque to the wheels 40.

In general, fuel is delivered to the engine such that the engine 14 can produce and deliver torque to the planetary gear set 24. The power provided from the engine 14 is expressed as $T_e \omega_e$, where $T_e$ is engine torque and $\omega_e$ is engine speed. Power delivered from the planetary gear set 24 to the meshing gears 32 is expressed as $T_r \omega_r$, where $T_r$ is ring gear torque and $\omega_r$ is ring gear speed. Power out from the meshing gears 32 is expressed as $T_s \omega_s$, where $T_s$ is the torque of shaft and $\omega_s$ is the speed of the torque shaft, respectively.

The generator 26 can provide or receive power from the planetary gear set 24. This is shown with the double arrows and expressed as $T_g \omega_g$, wherein $T_g$ is the generator torque and is $\omega_g$ the generator speed. As shown with path 48, the generator 26 can then supply power to or receive power from the battery 20 or the motor 28 during regenerative braking. As shown with path 50, the battery 20 can store energy received from the generator 26 and the motor 28 and it can release energy to the generator 26 and the motor 28. As shown with path 52, the motor 28 provides power to and receives power from the generator 26 and the battery 20. In addition, the motor 28 provides power to and receives power from the meshing gears 32. This is shown with the double arrows and expresses as $T_m \omega_m$, where $T_m$ is motor torque and cm is motor speed.

FIGS. 3-6 provide further illustration of the flow of power and the production of torque in the system 10.

FIG. 3 illustrates a positive split mode of operation. In this mode, the engine power is split between the meshing gears 32 and the generator 26, respectively. The splitting of power is controlled by the planetary gear set 24. The meshing gears 32 use the power received from the planetary gear set 24 to provide torque to the wheels 40. The battery 20 and the motor 28 can be controlled to receive power from generator 26. The motor 28 can provide torque to the meshing gears 32 based on power received from one or both of the generator 26 and the battery 20.

FIG. 4 illustrates a negative split mode of operation. In this mode, the generator 26 inputs power to the planetary gear unit 24 to drive the vehicle while the motor 28 acts as a generator and the battery 20 is charging. It is possible, however, that under some conditions the motor 28 may distribute power to the meshing gearing 32, in which case the battery 20 would power both the generator 26 and the motor 28.

FIG. 5 illustrates a parallel mode of operation. In this mode, a generator brake 60 is activated and the battery powers the motor 28. The motor 28 then powers the meshing gearing 32 simultaneously with delivery of power from the engine 14 delivered to the meshing gearing 32 by way of the planetary gear set 24. Alternatively, the motor 28 can act as a generator to charge the battery 20 while the engine 14 provides power to the wheels 40 or during regenerative braking.

FIG. 6 illustrates an electric only mode. In this mode, a one way clutch 62 brakes the engine. The motor 28 draws power from the battery 20 and effects propulsion independently of the engine 14, with either forward or reverse motion. The generator 26 may draw power from the battery 20 and drive against a reaction of the one-way coupling 62. The generator 26 in this mode operates as a motor.

The vehicle system controller 44 (VSC) selects the power and torque delivery mode based on the vehicle operating conditions and a predefined strategy. To this end, the vehicle system controller 44 receives a signal from a transmission range selector 66 (PRND), a desired engine torque request 68, as shown at, which is dependent on accelerator pedal position sensor output (APPS), and a brake pedal position sensor 70 (BPPS).

In response to the received signals, the vehicle system controller 44 generates signals to the engine 14, a transmission control module 74 (TCM), and a battery control module 76 (BCM). Theses signals include a desired engine torque 80, a desired wheel torque 82, a desired engine speed 84, a generator brake command 86, a signal 88 indicating battery contactor or switch is closed after vehicle "key-on" startup. The modules then provide further signal to control the hybrid vehicle, such as a generator brake control 90, a generator control 92, and a motor control 94.

The vehicle system controller 44 and the other control modules, include sensors and software algorithms that can be used to detect electrical, mechanical, software and other conditions in the system 10.

For the purposes of the present invention, a primary drivetrain designation and an auxiliary drivetrain designation are provided. These designations are meant to cover all types of hybrid vehicles and to differentiate between the drivetrains of the different hybrid vehicles. In particular, which are based on consumption based power sources, such as an engine or a fuel cell, and storage based power sources, such a battery.

In detail, the primary drivetrain includes all the software, electronics, and mechanisms required for the engine 14, or fuel cell if used, to provide torque to the wheels 40. The auxiliary drivetrain includes all the software, electronics, and mechanisms required for providing torque to the wheels when the engine is shut-off.

For the parallel/series hybrid vehicle shown in FIG. 1, the generator 26, the battery 20, and the motor 28 are the primary components of the auxiliary drivetrain, in combination with the planetary gear set 24 if needed or available depending on the condition, selected gears of the meshing gears 32, and the torque shaft 36 used to transfer torque to the differential axle mechanism 38 for final delivery to wheels 40.

The vehicle system controller 44 monitors the primary drivetrain and the auxiliary drivetrain for an interruption or permanent disruption to the software, electrical, or mechanical function of any item in the drivetrains which would indicate future unavailability of the primary drivetrain to produce energy for storage in the auxiliary drivetrain.

For the exemplary hybrid system shown in FIG. 1, unavailability of the primary drivetrain would correspond to an condition which would render the engine 14 unsuitable for providing torque to the wheels 40 or unsuitable for providing power to the generator 26 or the battery 20 for use by the motor 28 in providing torque to the wheels 40. In other words, unavailability of the primary drivetrain means the auxiliary drivetrain must provide the torque to the wheels without any replenishment of power from the primary drivetrain, i.e. the engine or a fuel cell.

When the engine 14, or a fuel cell if used, of the primary drivetrain is unable to provide torque to the wheels or replenish energy consumed by the auxiliary drivetrain, the vehicle will gradually stop due to lack of available power. Regenerative braking can occur in the auxiliary drivetrain, but it will typically not be sufficient for prolonged driving.

With respect to the exemplary system shown in FIG. 1, the operation of the auxiliary drivetrain is generally limited to the available battery energy remaining in the battery 20 during unavailability of the primary drivetrain. This is due to the unavailability preventing the use of the engine 14 to replenish the energy in the auxiliary drivetrain, except for possibly some limited replenishing by regenerative braking.

The limiting relates to limiting work done by the electric motor 28 relative to its normal operating parameters. In other words, a driving characteristic of the electric motor 28, such as power output and vehicle speed, is limited so that the HEV performance can be controlled to use less power, and in most cases decreased, to prolong operation of the HEV. The limited operation is commonly referred to as a limp home feature.

The performance is limited according to performance limiting strategies which are based in part on the future availability or unavailability of the primary drivetrain to produce energy for storage in the auxiliary drivetrain. The performance is limited further when the primary drivetrain is unavailable in the future. This is done to prolong operation of the vehicle by causing the electric motor to consume less energy than it would otherwise consume if the primary drivetrain were available.

The severity of the limiting is based on the available battery energy remaining in the battery 20 after the condition and as its continued consumption. The vehicle system controller 44 can measure or calculate the available battery energy to determine the limiting.

The vehicle system controller 44 can determine a battery voltage, a battery state of charge, or a battery discharge power limit to determine the available battery energy and the corresponding limitation of the driving characteristics, such speed and power.

One limitation technique relates to setting a maximum driving speed of the HEV. By controlling the maximum driving speed, the vehicle system control can insure the battery energy required to achieve relatively high vehicle speeds is limit and used to prolong vehicle operation at lower speeds.

Figure 7:
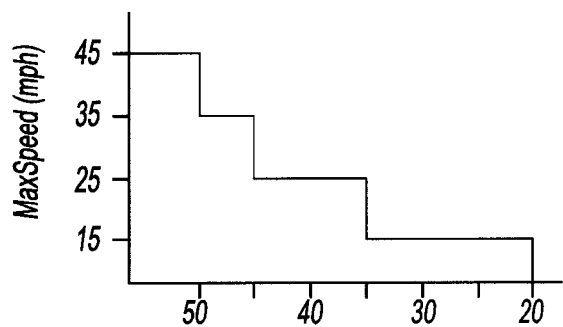
FIG. 7 illustrates limiting motor performance by setting a maximum speed as a function of a battery state of charge.

As shown in FIG. 7, the maximum vehicle speed can be controlled as a function of the battery state of charge. Preferably, the maximum speed is set to 45 mph if the battery state of charge is above 50%, 35 mph if the battery state of charge is between 50% and 45%, 25 mph if the battery state of charge is between 45% and 35%, and 15 mph if the battery state of charge is between 35% and 20%.

Another limitation technique relates to setting a maximum power output of the electric motor. By controlling the maximum power output, the vehicle system controller can control the rate of energy consumption. In this manner, the operation of the vehicle is less important that how rapidly the energy is being consumed. In other words, the vehicle speed and acceleration is indirectly controlled by setting the maximum power output of the electric motor.

Figure 8:
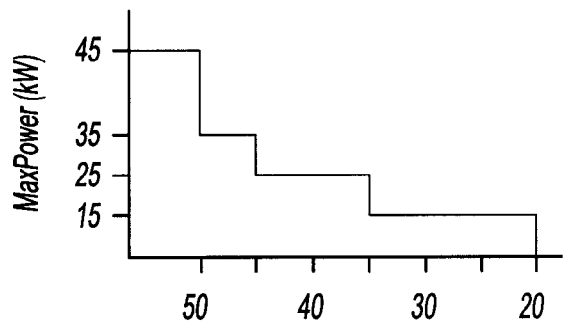
FIG. 8 illustrates limiting motor performance by setting a maximum power output as a function of a battery state of charge.

As shown in FIG. 8, the maximum power limit of the electric motor can be controlled as a function of the battery state of charge. Preferably, the maximum power limit is set to 25 kW if the battery state of charge is above 50%, 15 kW if the battery state of charge is between 50% and 45%, 10 kW if the battery state of charge is between 45% and 25%, and 5 kW if the battery state of charge is between 35% and 20%.

Another limitation technique relates to setting a maximum speed and maximum power limit. This combined control approach limits both the vehicle speed and the power expense of achieving the vehicle speed.

Figure 9:
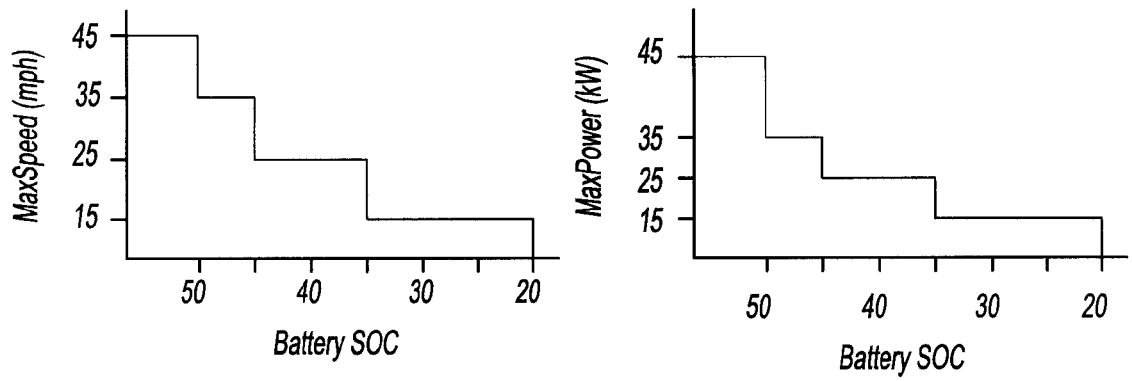
FIG. 9 illustrates limiting motor performance by setting a maximum power output and a maximum speed as a function of a battery state of charge.

As shown in FIG. 9, the combined limits for setting the maximum vehicle speed and the maximum power can be controlled as a function of the battery state of charge. Preferably, the combined limits are set to 45 mph and 25 kW if the battery state of charge is above 50%, 35 mph and 15 kW if the battery state of charge is between 50% and 45%, 25 mph and 10 kW if the battery state of charge is between 45% and 35%, and 15 mph and 5 kW if the battery state of charge is between 35% and 20%.

Another limitation technique relates to a relationship for controlling actual power provided by the electric motor as a function of the maximum speed and maximum power limits. In this manner, the consumption of energy from the battery is dynamically controlled based on real time monitoring of HEV operation.

Preferably, the actual power is limited according to the following algorithm:

$$AP = 2*MP*\left(\frac{MS-VS}{MS}\right) - MP*\left(\frac{MS-VS}{MS}\right)^2$$

wherein:
AP=actual power (kW);
MP=maximum power (kW);
MS=maximum vehicle speed (mph); and
VS=actual vehicle speed (mph).

Figure 10:
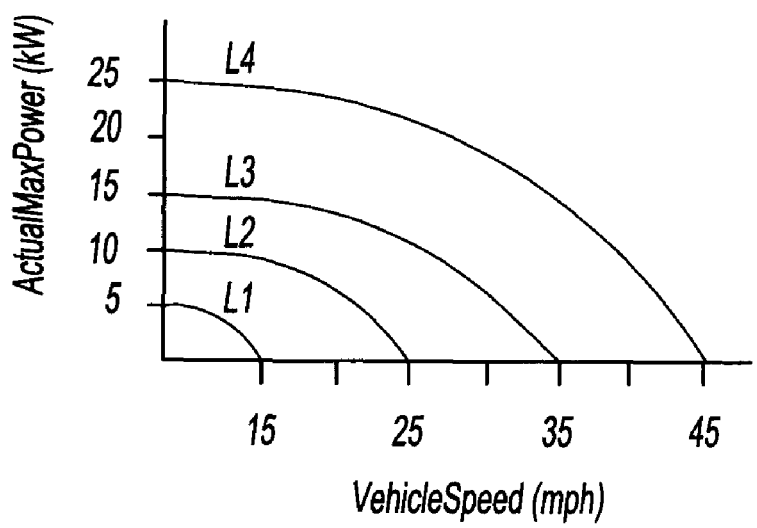
FIG. 10 illustrates dynamically limiting motor performance by controlling actual power output as a function of vehicle speed, maximum power, and maximum speed.

FIG. 10 illustrates the effect of the actual power limit algorithm for selected maximum power and maximum speed limits. In particular, the values correspond with a curve L1 for a maximum speed of 45 mph and a maximum power of 25 kW if the battery state of charge is above 50%, with a curve L2 for a maximum speed of 35 mph and a maximum power of 15 kW if the battery state of charge is between 50% and 45%, a curve L3 for a maximum speed of 25 mph and a maximum power of 10 kW if the battery state of charge is between 45% and 35%, and a curve L4 for a maximum speed of 15 mph and a maximum power of 5 kW if the battery state of charge is between 35% and 20%.

The control of the actual power is based on dynamically controlling the actual power provided by the electric motor as a function of the current vehicle speed. In this manner, an inverse relationship is set up between speed and power such that less power is available as the vehicle speed approaches the maximum speed limit and more power is available as the vehicle speed decreases relative to the maximum speed limit.

In addition to limiting a driving characteristic of the electric motor performance, the limiting can comprise shutting down the vehicle if the available battery energy becomes so low that the primary drivetrain may not be restarted. This may only be applicable to electric start hybrids having engines which require starting torque from the energy storing device. Preferably, the vehicle is shutdown if the battery state of charge drops below 20%.

As described above, the various limiting techniques utilized battery state of charge to indicate the available battery energy remaining during the condition. Each of the limiting techniques could be executed based on other energy indicators for the battery, such as voltage, discharge limit, or other substitute for battery state of charge.

The limiting focused on limiting a driving condition of the electric motor by directly controlling the electric motor. Alternatively, the electric motor could be passively controlled by, for example, controlling the battery such that the energy provided by the battery is controlled. By controlling the battery directly, the driving characteristics of the electric motor can be passively limited by the outputted battery power.

While the best mode for carrying out the invention has been described in detail, those familiar with the art to which this invention relates will recognize various alternative designs and embodiments for practicing the invention as defined by the following claims.

What is claimed:

1. A method of controlling a vehicle having a primary drivetrain and an auxiliary drivetrain, the primary drivetrain relying on fuel consumption to provide energy for driving the vehicle and the auxiliary drivetrain relying on stored electrical energy to provide energy for driving the vehicle, the method comprising:
controlling the auxiliary drivetrain according to a first performance strategy when the primary drivetrain has a sufficient supply of fuel to facilitate re-charging the stored electrical energy relied upon by the auxiliary drivetrain;
controlling the auxiliary drivetrain according to a second performance strategy when the primary drivetrain has an insufficient supply of fuel to facilitate re-charging the stored electrical energy relied upon by the auxiliary drivetrain; and
wherein the second performance strategy includes setting a plurality of maximum vehicle speed and power ranges that are more restrictive than maximum vehicle speed and power ranges set according to the first performance strategy.

2. The method of claim 1 wherein the second performance strategy consumes less of the stored electrical energy than the first performance strategy, thereby limiting vehicle driving performance more than if operating according to the first performance strategy.

3. The method of claim 1 wherein the second performance strategy allows the auxiliary drivetrain to drive the vehicle for a longer period of time than the first performance strategy.

4. The method of claim 1 wherein the second performance strategy includes setting a plurality of maximum vehicle speed ranges that are more restrictive than maximum vehicle speed ranges set according to the first performance strategy.

5. The method of claim 1 further comprising, after the primary drivetrain has the insufficient supply of fuel to facilitate re-charging the stored electrical energy relied upon by the auxiliary drivetrain, controlling the auxiliary drivetrain according to the first performance strategy if the fuel is replenished to the sufficient supply, and determining the primary drivetrain to have insufficient supply of fuel to re-charge the stored electrical energy in the event the primary drivetrain supply of fuel is less than a threshold.

6. The method of claim 1 wherein the second performance strategy includes limiting actual power consumed by the electric motor to drive the vehicle, the actual power being limited based on a relationship between a maximum power limit and a maximum speed limit for the electric motor.

7. The method of claim 1 further comprising shutting down the auxiliary drivetrain prior to depleting the stored electrical energy relied upon by the auxiliary drivetrain when an amount of the stored electrical energy is less than an amount of electrical energy needed to restart the primary drivetrain.

8. A method of controlling a vehicle comprising:
controlling an auxiliary drivetrain according to a first strategy when a primary drivetrain fuel supply permits re-charging the auxiliary drivetrain;
controlling the auxiliary drivetrain according to a second strategy when the fuel supply prevents re-charging the auxiliary drivetrain, the second performance strategy setting a plurality of maximum power ranges that are more restrictive than maximum power ranges set according to the first performance strategy.

9. A method of controlling a vehicle having a first, liquid fuel powered drivetrain and a second, electric energy powered drivetrain, the method comprising:
determining a first amount of fuel available for powering the first drivetrain;
setting operating parameters for controlling operations of the second drivetrain according to operating parameters specified by a first strategy when the first amount of fuel is above a fuel threshold;
setting operating parameters for controlling operations of the second drivetrain according to operating parameters specified by a second strategy when the first amount of fuel is below the fuel threshold;
determining the fuel threshold to at least equal an amount of fuel consumed by the first drivetrain to charge an energy source used to power the second drivetrain above a charging threshold; and
wherein the second performance strategy includes setting a plurality of maximum vehicle speed and power ranges that are more restrictive than maximum vehicle speed and power ranges set according to the first performance strategy.

10. The method of claim 9 further comprising selecting the charging threshold based on an amount time the vehicle is to operate according to the second performance strategy such that the charging threshold is greater when the amount of time is greater.

11. The method of claim 9 further comprising selecting the charging threshold based on consumption habits of the second drivetrain when operated according to the second strategy, the second performance strategy setting a plurality of maximum power ranges that are more restrictive than maximum power ranges set according to the first strategy.

12. The method of claim 9 further comprising setting the operating parameters such that less of a second amount of energy available from the energy source for powering the second drivetrain is used when operating according to the second strategy than when operating according to the first strategy.

13. A method of controlling a vehicle having a primary drivetrain and an auxiliary drivetrain, the primary drivetrain relying on fuel consumption to provide energy for driving the vehicle and the auxiliary drivetrain relying on stored electrical energy to provide energy for driving the vehicle, the method comprising:
controlling the auxiliary drivetrain according to a first performance strategy when the primary drivetrain has a sufficient supply of fuel to facilitate re-charging the stored electrical energy relied upon by the auxiliary drivetrain;
controlling the auxiliary drivetrain according to a second performance strategy when the primary drivetrain has an insufficient supply of fuel to facilitate re-charging the stored electrical energy relied upon by the auxiliary drivetrain; and
determining the supply of fuel needed to facilitate re-charging the stored electrical energy relied upon by the auxiliary drivetrain to at least equal an amount of fuel needed to charge an energy source that provides the stored electrical energy above a charge threshold.

* * * * *